United States Patent [19]
Svensson

[11] Patent Number: 5,599,153
[45] Date of Patent: Feb. 4, 1997

[54] METHOD AND A SYSTEM FOR TRANSPORTING VEHICLES

[75] Inventor: Stig-Åke Svensson, Halmstad, Sweden

[73] Assignee: Floatline AB, Halmstad, Sweden

[21] Appl. No.: 403,926

[22] Filed: Mar. 22, 1995

[30] Foreign Application Priority Data

Sep. 24, 1992 [SE] Sweden .................. 9202760

[51] Int. Cl.⁶ .................................. B65G 67/60
[52] U.S. Cl. .................. 414/143.2; 410/26; 414/572; 414/786
[58] Field of Search .................. 410/4, 14, 24, 410/26; 414/143.2, 398, 400, 572, 786

[56] References Cited

U.S. PATENT DOCUMENTS

| 3,498,480 | 3/1970 | Gutridge | 414/398 |
| 4,455,119 | 6/1984 | Smith | 410/14 X |
| 5,040,935 | 8/1991 | Gearin et al. | 414/143.2 X |

FOREIGN PATENT DOCUMENTS

| 0274882 | 7/1988 | European Pat. Off. | |
| 0444362 | 9/1991 | European Pat. Off. | |
| 40477 | 10/1965 | Germany | 414/143.2 |
| 1556867 | 1/1970 | Germany | |
| 3112901 | 2/1982 | Germany | |
| 5-185984 | 7/1993 | Japan | 414/143.2 |
| 88/05001 | 7/1988 | WIPO | |

*Primary Examiner*—Karen B. Merritt
*Assistant Examiner*—Janice L. Krizek
*Attorney, Agent, or Firm*—Nies, Kurz, Bergert & Tamburro

[57] ABSTRACT

A method and apparatus for the transportation of vehicles, primarily cars, by a seagoing vessel. The vehicles are loaded onto cassettes that include at least one floor or story, with each floor or story including a vehicle driveway. The cassettes are loaded by driving the vehicles onto a ramp, or the like, and onto the driveway. The vehicles are positioned one behind the other until the cassette has been loaded with the desired number of vehicles. The cassette is then transported onto the vessel. The vehicles are offloaded in the reverse order so that the cassette is first transported from the vessel to the dock, and the vehicles are driven from the cassette with the aid of a ramp, or the like.

10 Claims, 3 Drawing Sheets

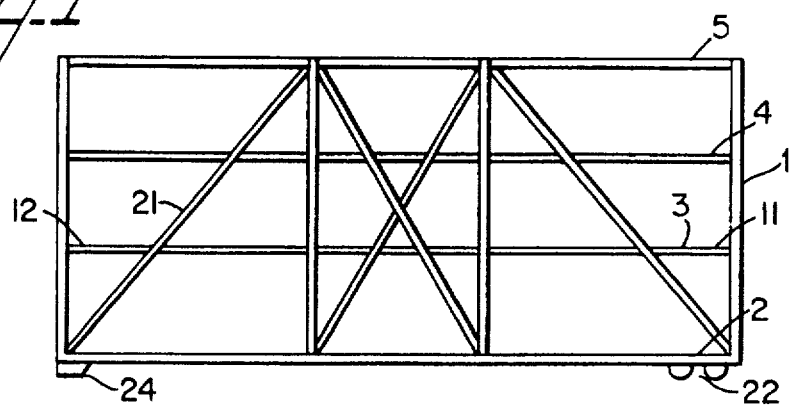
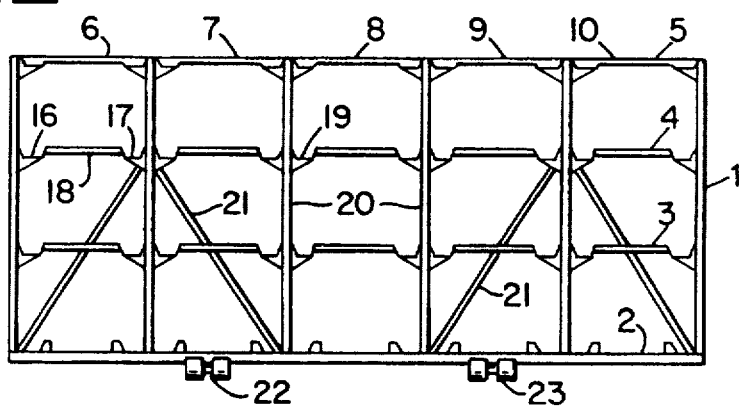
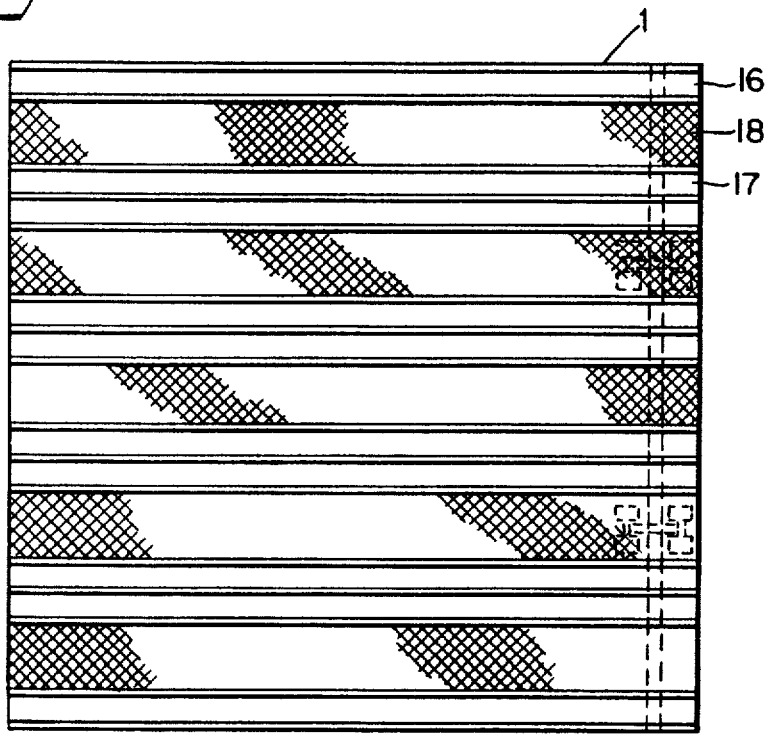

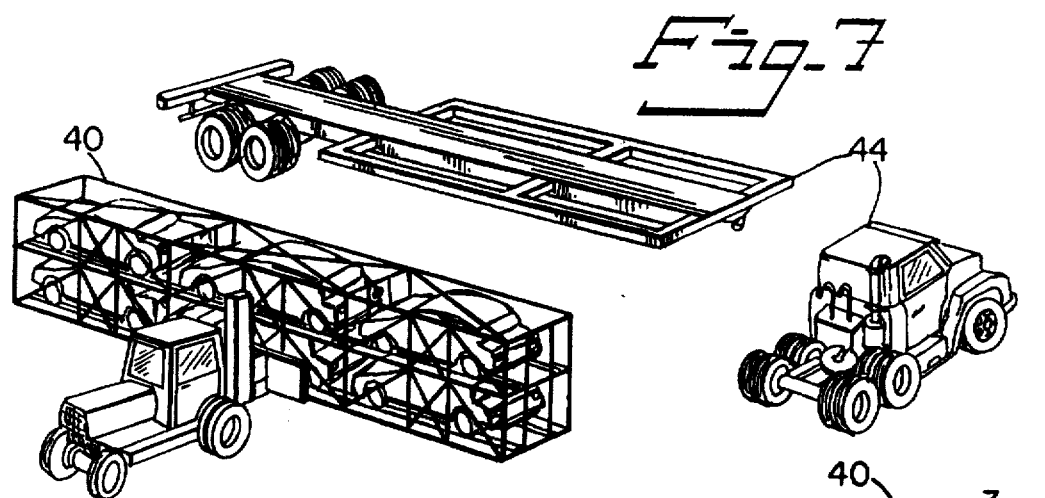
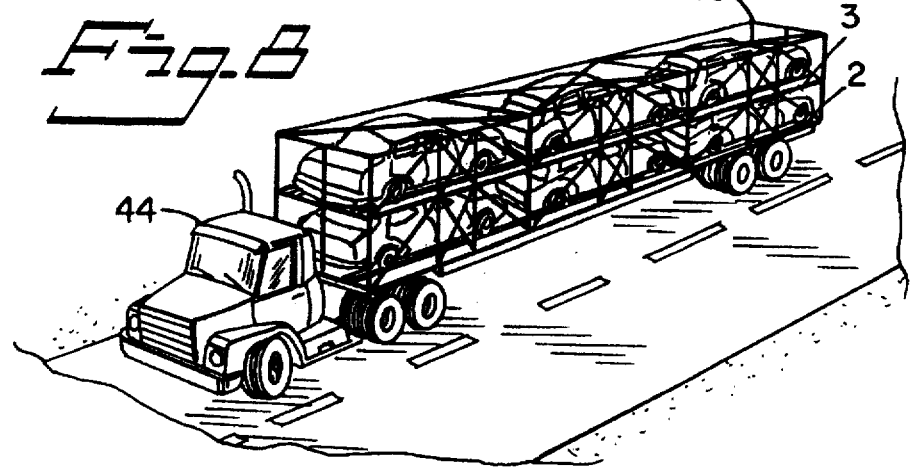
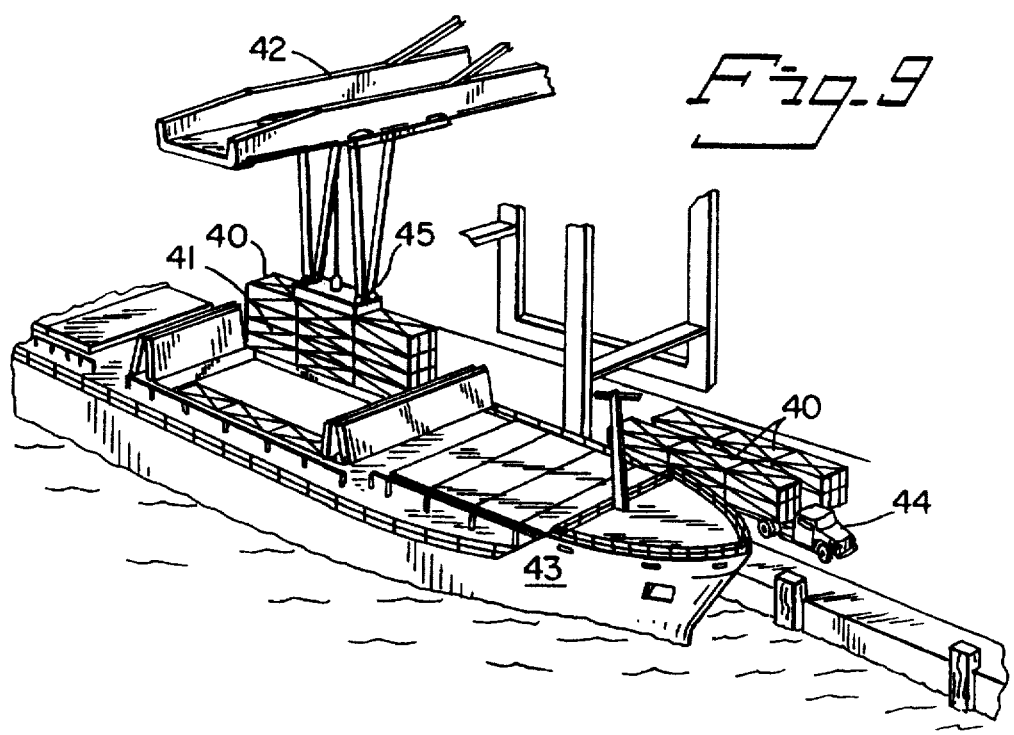

METHOD AND A SYSTEM FOR TRANSPORTING VEHICLES

BACKGROUND OF THE INVENTION

1. Field of the Invention

The preset invention relates to a method and to a system for transporting vehicles, primarily cars, by ship.

2. Description of the Related Art

It is very usual to transport cars by sea, when so is possible. The transportation of all cars between continents which have no land connections takes place by sea.

One of the methods most commonly used today involves driving the cars onto the ship, or corresponding transport vessel, with the aid of ramps which extend between quay and ship. The cars are driven onto the ship one after the other and are parked on different decks in the ship. Because one such ship takes onboard a large number of cars, an extremely long time is taken to load the ship, despite the simultaneous use of several ramps. This also applies to offloading the ship.

The time taken to load and offload a car-transporting vessel encompasses several hours. Ibis creates particular problems when the ship is loaded and offloaded during the nighttime.

Because the cars are drive onboard ship and are driven off the ship, the cars are liable to suffer considerable damage, resulting in extensive costs.

The present invention relates to a fully novel method for loading and off loading cars onto and from ships. This novel method solves the aforesaid drawbacks associated with known methods.

SUMMARY OF THE INVENTION

The present invention thus relates to a method for transporting vehicles, primarily cars, by sea and is characterized in that the vehicles are loaded into cassettes which include at least one floor plan, wherein each floor includes a driveway; in that the vehicles are loaded by driving the vehicles onto a ramp, or corresponding device, and onto said driveway where the vehicles are placed in line one after the other until the cassette has been loaded with the desired number of vehicles; in that the cassette is than transported onto the vessel; and in that the cars are offloaded from the vessel in the reverse order, in which the cassette is first transported from the vessel onto the quay and the vehicles are driven from the cassette with the aid of a ramp or some like device.

The invention also relates to an arrangement of the aforesaid kind.

BRIEF DESCRIPTION OF THE DRAWINGS

The invention will now be described in more detail with reference to an exemplifying embodiment thereof and also with reference to the accompanying drawings, in which FIG. 1 is a side view of an inventive cassette;

FIG. 2 is a rear view of the cassette shown in FIG. 1;

FIG. 3 shows a cassette floor from above;

FIG. 7 shows a cassette lifted onto a transport lorry;

FIG. 8 illustrates transportation of the cassette by means of a vehicle transporter; and FIG. 9 illustrates lifting of a cassette onto a vessel.

DESCRIPTION OF THE PREFERRED EMBODIMENTS

Figure 4:
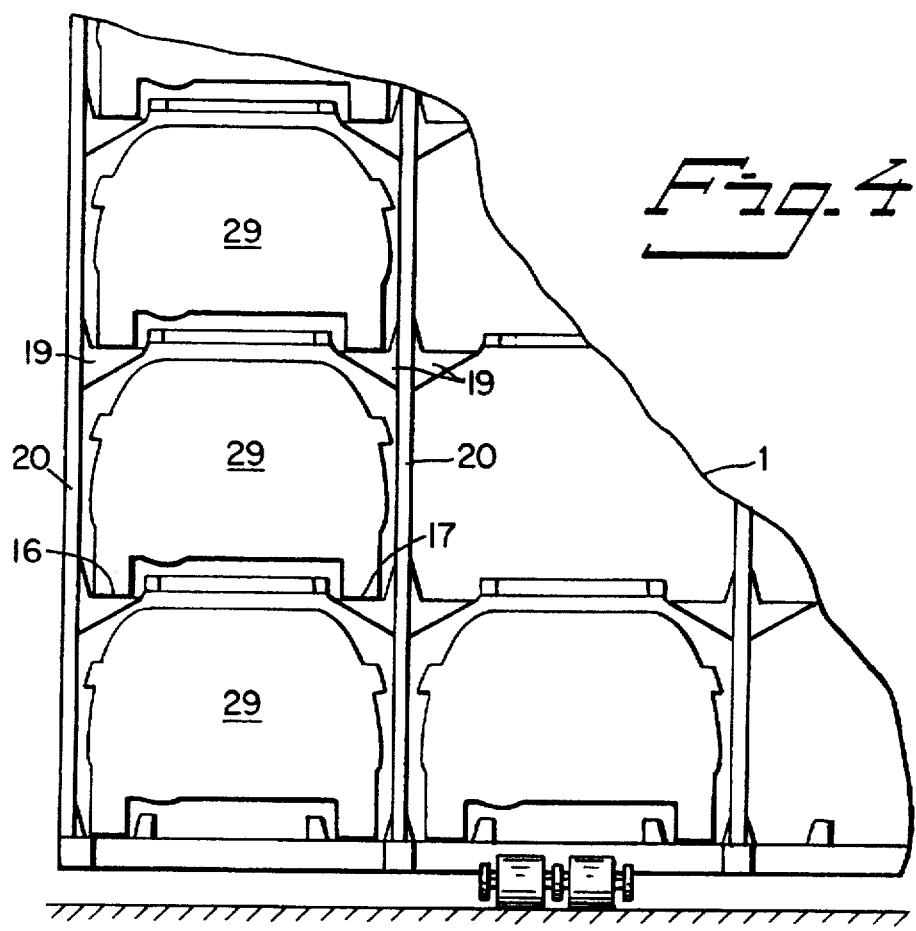
FIG. 4 is a front view of part of a cassette, and indicates schematically the number of cars present in the cassette.

FIGS. 1–4 illustrate one exemplifying embodiment of an inventive system.

The system includes one or more cassettes, of which one cassette, referenced 1, is shown in FIGS. 1–4. Each cassette 1 has at least one floor or storey 2–5, and each floor or storey includes at least one driveway.

According to a first, preferred embodiment of the invention, each cassette 40 includes only two floors, where each floor is intended to accommodate three cars, one behind the other, see FIG. 7.

Furthermore, according to this first embodiment, each cassette is equipped with conventional, standardized attachment devices (not shown) on the upper and the lower part of the cassette framework, these attachment devices being used to lift the cassette or casettes onboard the vessel, by means of a known container lifting yoke.

According to one preferred embodiment of the invention, the cassettes can be coupled together to form a unit which comprises several cassettes placed side-by-side and/or one above the other, said cassette unit being intended to be lifted and transported in its unit form. FIG. 9 illustrates two such units 40, 41 which have been lifted onboard by means of one and the same hoist and by means of a container crane 42 onboard a vessel 43.

Thus, according to this first embodiment of the invention, the attachment devices of each cassette are so dimensioned as to enable the cassette, or cassette unit, to be lifted by a conventional container yoke 45.

For instance, a cassette 40 or a cassette unit having two floors, with each floor accommodating three cars, can be lifted onto a vehicle transporter 44, see FIG. 7, at the factory site, transported to a quay, see FIG. 8, and then lifted onto a vessel 43 in a so-called container lift.

As will be understood, the cars can be transported to the quay alongside which the vessel is moored by rail instead of by road.

When the vessel has reached its destination, the cassette units are lifted from the vessel and then onto a car transporter for further transportation to their place of delivery. Alternatively, the cars, vehicles, can be driven from their cassettes on the quay side, or corresponding landing place, for further transportation in some other way.

According to this embodiment, in which the cassettes can be transported both by road and by sea, the vehicles can be driven into respective cassettes on the factory site and then transported in their cassettes to their final destination, without needing to be driven. Because car manufacturers manufacture vehicles to an ever-increasing extent for a given ultimate customer, the possibility of placing selected vehicles in a given cassette intended for transportation to a given car retailer from which said customers have ordered their vehicles is highly advantageous. The arrangement of car transportation according to the present invention results in lower costs for ranging the vehicles both before and after long-distance transportation in comparison with transport techniques used at present.

FIG. 2 illustrates another embodiment of the invention in which the cassettes are provided with a plurality of mutually parallel driveways 6–10. The construction of the cassettes will be described in detail in conjunction with this second embodiment of the invention, this construction principle being common to the first and the second embodiment of the invention.

Figure 5:
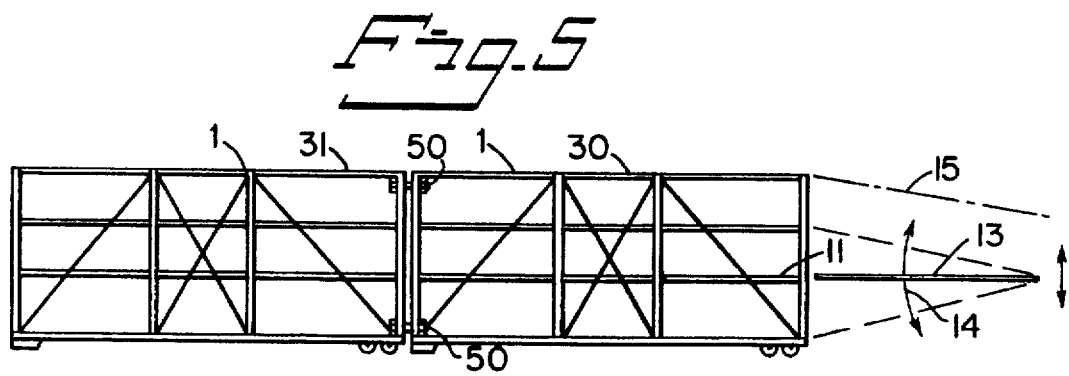
FIG. 5 illustrates two sequentially located cassettes, and a ramp.

The driveways 6–10 on each floor are so constructed that one or both ends 11, 12 of the driveways can be connected to ramps 13, see FIG. 5. The rumps 13 are arranged so that the vehicles 29 can be driven from the quay side onto a ramp, or like device, and onto said driveways, where the vehicles are positioned one behind the other, until the cassette has been loaded with the desired number of vehicles.

FIG. 5 illustrates schematically the possibility of angling one and the same ramp 13 to the horizontal plane, as indicated by the arrows 14, and also shows that the ramps can be displaced vertically, in the manner illustrated by the chain line 15.

Thus, the aforesaid ramps can be positioned in successive order so as to connect the various driveways with the quay or the like.

FIGS. 2 and 4 are rear views of the cassette. According to the exemplifying embodiment, the driveways have the form of tracks 16, 17 in which the wheels of the vehicles run. A floor plate 18 or like device is mounted between the tracks. The cassettes are constructed of horizontal beams 19 and vertical posts 20 and a number of braces or ties 21, which together form a frame-lattice structure. This structure is conveniently constructed from steel beams and steel plates of standard design. The cassettes are therefore relatively cheap to produce. The configuration of the cassettes can be varied in many ways, obvious to one skilled in this art, defending on the number of floors desired, the number of driveways on each floor, and the type of the vehicle which the cassettes are intended to carry.

Modern cars have essentially the same width and breadth measurements. The driveways provided in the cassettes can therefore be constructed in a manner which will enable the vehicles to be densely packed.

Subsequent to driving the maximum number of vehicles into the cassette, the cassette is prepared for transportation onto the vessel. When offloading the cassette, the cassette is transported from the vessel to the quay side and then connected to ramps of the aforesaid kind for driving the vehicles onto the quay or some like platform structure. The cassettes are therefore provided with wheels 22, 23.

According to one embodiment, the cassette is intended to be pulled onboard or onto the quay side by means of a pulling vehicle. To this end, each cassette is provided with a suitable coupling 24 by means of which the pulling vehicle can be coupled to the cassette. As an alternative to a pulling vehicle, the cassettes may be pulled onboard or onto the quay with the aid of cables or chains.

Figure 6:
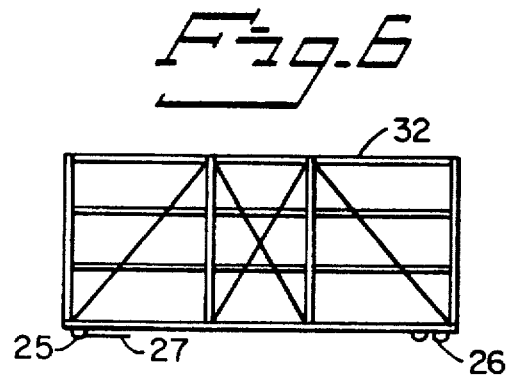
FIG. 6 illustrates a cassette equipped with drive machinery.

Alternatively, each cassette 32 may be provided with four wheels, or wheel-pairs 25, 26, and an individual motor 27 and known drive mechanisms, so that the cassette can be drive onto the vessel or off the vessel by means of its own driving mechanism, i.e. automotively, as illustrated in FIG. 6.

The cassettes may include two or more floors and more than one parallel driveway on each floor. Furthermore, each driveway will have a length which will enable at least two cars to be placed one behind the other. This means that each cassette is able to accommodate several vehicle.

According to one important embodiment, the cassettes are constructed so as to enable them to be placed behind one another, to coact with driveways of two sequentially arranged cassettes so that vehicles can be driven on driveways from one cassette 30 over to another cassette 31, as illustrated in FIG. 5. In practice, plates can be laid-out in the tracks 16, 17, in a manner to form a bridge for each driveway between two neighbouring cassettes. This construction can also be used advantageously in the afore-described first embodiment of the invention.

According to one preferred embodiment, the cassettes can be coupled mechanically with the aid of appropriate, known coupling devices, such as bolts 50 (see FIG. 5), hooks or the like. Cassettes which are coupled together in this way will have good stability when transported onto the vessel.

Furthermore, cassettes can be coupled together with the intention of utilizing the total loading capacity of the cassettes to better effect. Assume that the lengths of the vehicles loaded into a cassette mean that each cassette is able to accommodate two and a half vehicles positioned in line, one after the other on a driveway. By coupling two cassettes together, the resultant cassette unit will accommodate five vehicles, or cars, on each driveway instead of four vehicles.

The inventive method can thus be applied in a manner which will enable vehicles to be loaded into one or more cassettes which include a number of floors, where each floor includes a number of parallel driveways. When loading the cassettes, vehicles can be driven onto the ramps, or the like, from the quay side, or the like, onto the driveways, where the vehicle, or cars, are placed in line with one another until a desired number of cassettes have been loaded with a desired number of vehicles. As shown in FIG. 5, when loading and off loading the cassettes, a number of cassettes are preferably placed one after the other, whereby a number of cassettes are loaded or offloaded simultaneously with the aid of one and the same ramp. The cassettes are then transported onto the vessel. Offloading is effected in the reverse order, wherein the cassettes are transport from the vessel to the quay and the vehicles are driven out of the cassettes onto the quay, or the like with the aid of a ramp.

It will be evident from the aforegoing that the time-consuming task of loading and off loading vehicles, namely the driving of vehicles onto and the driving of vehicles off transporters, is effected on land and thus irrespective of whether the vessel is tied along side a quay or not. This means that cars can be transported to and from the cassettes at those times during which personnel are available and during the daytime. Furthermore, the method affords the important advantage of enabling vehicles to be driven straight forwards when driving the vehicles into and out of the cassettes, which greatly reduces the risk of damaging the vehicles during vehicle loading and vehicle off loading operations, in comparison with the situation when vehicles are loaded and offloaded when using conventional techniques.

The present invention thus provides time-savings, cost-savings and enables the work to be planned so that the aforesaid advantages can be achieved.

It will be understood that the invention is not restricted to the described embodiments and that modifications can be made. For instance, the cassettes may be given different constructions and different sizes to the cassettes described by way of example.

Accordingly, the present invention shall not be considered to be restricted to the described and illustrated embodiments, since modifications and changes can be made within the scope of the following claims.

I claim:

1. A method for transporting vehicles, primarily cars, by means of a seagoing vessel, said method comprising: providing a plurality of cassettes that are coupled together to form a multicassette unit with said cassettes connected to each other, which cassettes include at least one floor, with each floor including a vehicle driveway, loading said cassettes by driving the vehicles onto said driveway, positioning the vehicles one after the other until the cassette has been loaded with the desired number of vehicles, transporting the cassette onto the vessel; offloading the vehicles in the reverse order, such that the cassettes are first transported from the vessel to a quay, driving the vehicles from the cassettes, wherein the transporting step includes lifting and transporting the cassettes to and from the vessel in their multicassette-unit form, and placing the cassettes in relation to one another such that vehicles are able to drive on the driveways from one cassette over to another cassette and to drive in a forward direction out from the cassette when unloading the vehicles.

2. A method according to claim 1, including the step of providing each cassette with two floors, each floor being intended to accommodate three vehicles, one after the other.

3. A method according to claim 1, including the step of using adjustable ramps for loading and unloading vehicles from the cassettes, and adjusting the setting of said ramps successively in a manner to connect the driveways with the quay.

4. A method according to claim 1, including the step of providing the cassette with wheels and pulling the cassette onboard the vessel or onto land using a pulling vehicle.

5. A method according to claim 1, wherein the cassette is provided with wheels and with an individual motor and drive mechanism so that the cassette can be driven onboard the vessel or on land.

6. A system for transporting vehicles, primarily cars, by means of a seagoing vessel, said system comprising: one or more cassettes which include at least one floor, each floor including a vehicle driveway, each driveway connectable to ramps so disposed that the vehicles can be driven onto the ramps and onto said driveways to position the vehicles one after the other until the cassette has been loaded with a desired number of vehicles to allow transporting of the cassette onto the vessel, and to allow the cassette to be transported from the vessel and connected to the ramps to permit driving the vehicles from the cassette and along the ramps, wherein ends of each driveway are connectable to the ramps, wherein the cassettes include means for coupling the cassettes together in a manner to form a multicassette-unit for lifting and transportation as a unit, and wherein the cassettes are constructed so that when positioned one behind the other, the driveways of two sequentially arranged cassettes coact to enable vehicles to be driven on driveways from one cassette over to another cassette and to enable the vehicles to be driven in a forward direction when unloading the vehicles.

7. A system according to claim 5, wherein each cassette includes two floors and each floor accommodates three vehicles positioned one after the other.

8. A system according to claim 6, wherein the ramps are adjustable to successive settings in a manner to connect the driveways with a quay.

9. A system according to claim 6, wherein the cassette includes wheels; and wherein the cassette can be drawn onto the vessel or onto the land by means of a pulling vehicle.

10. A system according to claim 6, wherein the cassette includes wheels; and wherein the cassette includes an individual motor and an individual drive mechanism so that the cassette can be driven onto the vessel or onto the land automotively.

* * * * *

UNITED STATES PATENT AND TRADEMARK OFFICE
CERTIFICATE OF CORRECTION

PATENT NO. : 5,599,153
DATED : February 4, 1997
INVENTOR(S) : STIG-AKE SVENSSON

It is certified that error appears in the above-indentified patent and that said Letters Patent is hereby corrected as shown below:

In claim 7, line 1, change "5" to --6--.

Signed and Sealed this

Twenty-ninth Day of April, 1997

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,599,153
DATED : February 4, 1997
INVENTOR(S) : Stig-ake Svensson

It is certified that error appears in the above-indentified patent and that said Letters Patent is hereby corrected as shown below:

On the COVER PAGE, correct item [22] to read:

[22] PCT Filed: September 24, 1993

On the COVER PAGE, add the following item:

[86] PCT No.: PCT/SE93/00770

§ 371 Date: March 22, 1995

§ 102(e) Date: March 22, 1995

[87] PCT Pub. No.: WO94/06677
PCT Pub. Date: March 31, 1994

Signed and Sealed this

Fifth Day of August, 1997

Attest:

BRUCE LEHMAN

Attesting Officer

Commissioner of Patents and Trademarks